Figures 1, 2:
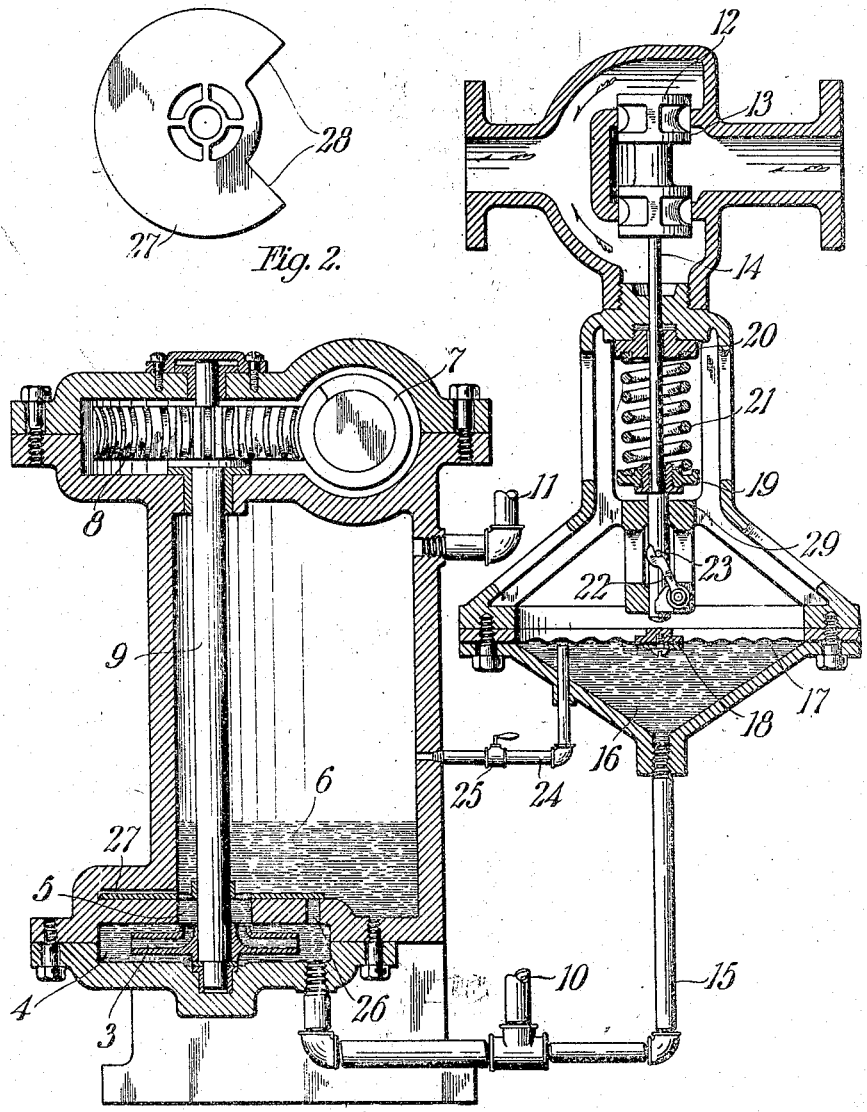

R. N. EHRHART.
ELASTIC FLUID TURBINE.
APPLICATION FILED MAR. 9, 1905.

941,409. Patented Nov. 30, 1909.

Witnesses
G. L. Ryder.
E. W. McAllister.

Inventor
Raymond N. Ehrhart
By his Attorney
Jno. S. Green

UNITED STATES PATENT OFFICE.

RAYMOND N. EHRHART, OF PITTSBURG, PENNSYLVANIA, ASSIGNOR TO THE WESTINGHOUSE MACHINE COMPANY, A CORPORATION OF PENNSYLVANIA.

ELASTIC-FLUID TURBINE.

941,409.

Specification of Letters Patent. Patented Nov. 30, 1909.

Application filed March 9, 1905. Serial No. 249,277.

*To all whom it may concern:*

Be it known that I, RAYMOND N. EHRHART, a citizen of the United States, and a resident of Pittsburg, in the county of Allegheny and State of Pennsylvania, have invented a new and useful Improvement in Elastic-Fluid Turbines, of which the following is a specification.

This invention relates to elastic fluid turbines.

It is now common with elastic fluid turbines to maintain a continuous flow of lubricating oil through the shaft bearings thereof, and an object of this invention has been to produce a device whereby the pump for forcing the oil through the bearings is utilized for operating the steam, or other working-fluid inlet valve to the turbine.

A further object has been to provide simple means whereby the fluid inlet valve to the turbine is caused to pulsate.

A still further object of this invention has been to produce a simple fluid operated device capable of being utilized for controlling the fluid inlet valves to various types of fluid pressure engines, the piston or pistons of which either reciprocate or rotate.

These and other objects I attain by means of the device described in the specifications and illustrated in the single sheet of drawing accompanying this application and forming a part thereof.

In the drawing, Figure 1 is a more or less diagrammatic view in section of a device embodying this invention, and Fig. 2 is a detail view of a portion of the same.

As the turbine or other type of engine with which this device may be used, in itself, forms no part of this invention, it has not been deemed necessary to illustrate the same, but without any idea of restricting the invention to use with elastic fluid turbines it will be supposed for the sake of this application that the device as illustrated is used with an elastic fluid turbine having suitable oil inlet and discharge ducts leading to its shaft or other bearings through which it is desired to maintain a continuous or substantially continuous flow of lubricating oil.

A centrifugal or other form of rotary pump consisting of a runner 3 mounted in a runner chamber 4, having a centrally disposed inlet 5 connecting to the bottom of an oil reservoir or tank 6, is driven from the turbine shaft by means of a worm 7 which meshes with a worm-wheel 8 mounted on a pump runner spindle 9. Any suitable forms of gears may be substituted for the worm and worm-wheel if desired.

A bearing-oil conveying-pipe 10 connects with the discharge outlet of the centrifugal pump, and leads to the bearings of the turbine to be lubricated. An overflow pipe from the bearings connects with pipe 11 and leads the oil from the bearings back to the reservoir or tank 6. The inlet orifice from the oil-reservoir to the pump chamber and the clearances around the pump runner, are proportioned so that when the pump is driven at its normal speed, which will be during the normal speeds of the turbine, this will be subject to slight variations between certain predetermined limits.

A fluid inlet or governing valve 12, having a piston or slide 13, provided with a stem 14, is located at some convenient point in the fluid supply line adjacent to the turbine to be governed. Located axially in line with valve stem 14 and connected with the oil discharge line from the pump, by means of a pipe 15, is an oil chamber 16. This oil chamber, which may be formed in any suitable manner, is provided with a yielding diaphragm wall 17, which, at its center, carries a contact piece 18 in line with the lower end of the valve stem, and which during the operation of the device, rests in contact therewith. The valve stem is provided with a spring retaining collar 19, and surrounding the stem and between said collar and an adjustable spring retaining member 20, a coil spring 21 is located.

When the turbine, and therefore the pump, is at rest, the valve stem 14 will rest in contact with the contact piece of the diaphragm, and the length of the stem is such that when at rest the collar 19 will contact with a stop 29 surrounding the valve stem; the spring will then be under only slight tension, the diaphragm forced to its lowest position, and the fluid inlet valve will then cut off the fluid supply to the turbine.

In order to admit the working fluid to the turbine for the purpose of starting, a pivoted latch 22 is provided, and by means of said latch, which when in its raised position is adapted to contact with a pin 23 on the valve stem, the valve stem may be manually raised until the valve is in an open position and there maintained by means of said latch and pin. In Fig. 1 of the drawing, the valve is shown in starting position with its stem resting out of contact with the diaphragm and there held by means of the latch.

In order to allow the chamber 16 to be filled with oil and the air therein to escape during the oil-filling process, I have provided a pipe 24, supplied with a valve 25, connecting the chamber 16 and the supply tank 6. During the operation of filling the chamber 16, the valve 25 is opened, allowing the air to escape and after the chamber is filled the valve may be shut off or turned to allow a restricted flow of oil from the chamber 16 to the supply tank.

The arrangement of the pipe is such that the discharge of oil will be from the top portion of the chamber 16 directly under the diaphragm 17 which permits the discharge of any air that may collect in the chamber 16. The flow through the pipe 24 may be restricted to such an extent that the pressure pumped by the centrifugal pump 3 will be practically unaffected. In order to cause the valve to pulsate and to overcome the static friction and tendency to stick, during the time it stands in its different positions and when moving from one position to another, the pump runner chamber is provided with an outlet 26, and pump spindle 9 carries a plate 27, having a cut-away portion 28 which, during each revolution of the pump, is adapted to uncover port 26 and allow the pump to discharge back into the reservoir 6. It will be seen that by this method the pressure in the oil chamber 16, over and above the pressure maintained at all times in the oil supply line to the bearings, will drop, and the valve stem, by means of the spring, will move downwardly and carry with it the valve piston. As these drops in pressure, due to the opening of the port 26, will only be of short duration, and as the pump will be driven at a relatively high rate of speed, it will be seen that the inlet valve will be caused to pulsate.

As soon as the pressure in chamber 16 is sufficient to raise the valve stem and the pin 23, carried thereby, out of contact with the latch 22, the latch will drop by gravity and the position of the inlet valve and therefore, the effective area therethrough, will be automatically controlled by the pressure produced by the pump.

The pressure produced by the centrifugal pump will vary as the square of the speed of the turbine shaft, so that as the speed of the shaft increases the pressure on the diaphragm will increase as the square of that speed, except for the drops in pressure occasioned by uncovering the outlet 26 to the pump chamber, and it will be seen by means of the device illustrated the speed of the turbine can be easily and readily regulated.

In case of accident to the centrifugal pump or in case the oil supply becomes low or is exhausted, the spring will force the valve stem to its lowest position, and on account of the arrangement of the inlet valve, the steam or other fluid supply to the turbine will be completely shut off.

In accordance with the provisions of the patent statutes, I have described the principle of operation of my invention, together with an apparatus which represents an embodiment thereof. I desire to have it understood that the apparatus is only illustrative and that the invention can be carried out by other means. The invention is not limited to a centrifugal pump, as any pump driven by the engine or apparatus to be governed may be utilized and various means may be employed for causing the variations or pulsations of effective pressure delivered by the pump.

Having thus described my invention, I claim:

1. In a governing device, a pump, a driving member in connection therewith, instrumentalities actuated by said pump for regulating the speed of said driving member, and means for periodically varying the effective effort of said pump whereby said instrumentalities are caused to pulsate in performing their functions.

2. In a governing device, a pump, a driving member connected therewith, a hydraulic system subsidiary to said pump and operated thereby, instrumentalities auxiliary to said hydraulic system for regulating the speed of said driving member, and means for varying the effective effort of said pump and thereby causing variations of pressure in said hydraulic system and a consequent pulsating of said instrumentalities.

3. In a governing device, a driving member, a pump connected therewith, a hydraulic pressure chamber auxiliary to said pump, a diaphragm in conjunction with said chamber and instrumentalities in contact therewith and actuated thereby for regulating the speed of the said driving member, and means dependent on the pump for causing regular variations in pressure in the said chamber and a consequent pulsating or vibrating of the said diaphragm in performing its functions.

4. In a governing device, a driving member, a pump connected therewith, a hydraulic pressure chamber auxiliary to said pump, a diaphragm in conjunction with said chamber, instrumentalities in contact therewith and actuated thereby for regulating the speed of said driving member, and means for varying the effective effort of said pump and thereby causing periodic variations of pressure within said chamber and a consequent pulsating of said diaphragm in performing its functions.

5. In an elastic fluid turbine, a governing device comprising a supply passage for said turbine, a valve in said supply passage for controlling the flow of motive fluid therethrough, a controlling device for said valve comprising a centrifugal pump means actuated by said pump for operating said valve to vary the supply of motive fluid to the turbine in accordance with the speed of the turbine, and means for varying the effective effort of said pump whereby the said valve is caused to pulsate.

6. In an elastic fluid turbine, a governing device comprising a supply passage communicating with said turbine, a valve in said passage, a centrifugal pump driven by said turbine, a hydraulic system subsidiary to said pump and operated thereby, means within said hydraulic system for actuating said valve to vary the supply of motive fluid to said turbine in accordance with the speed of the turbine, and means subsidiary to said pump for periodically varying the pressure within said system.

7. In an elastic fluid turbine, a governing device comprising a fluid supply passage communicating with said turbine, a valve in said passage, a centrifugal pump driven by said turbine, a hydraulic pressure chamber auxiliary to said pump, a diaphragm in connection with said chamber, instrumentalities in contact therewith and operated thereby for actuating said valve to vary the supply of motive fluid to said turbine in accordance with the speed of the turbine, and means subsidiary to said pump for periodically varying the pressure within said chamber.

8. In combination with the fluid admission valve of an elastic fluid turbine, a pump driven by said turbine, a hydraulic pressure chamber auxiliary to said pump, a diaphragm in connection with said chamber, instrumentalities in contact therewith and actuated thereby for controlling the operation of said valve, and a cut-off plate operating in conjunction with said pump for causing periodic variations of pressure within said chamber and a consequent pulsating of said valve.

9. In combination with a member to be governed, a speed-governing device comprising a pump driven by said member, instrumentalities actuated by said pump for regulating the speed of said member and a periodically opening by-pass for varying the effective effort of said pump.

10. In combination with an elastic fluid turbine, a fluid-supply passage delivering motive fluid to said turbine, a valve controlling the delivery of fluid through said passage, a pump actuated and driven by said turbine and actuating said valve and a periodically opening by-pass for varying the effective effort of said pump and thereby causing said valve to pulsate the fluid delivered to said turbine.

11. In combination with an elastic fluid turbine, a fluid-supply passage for the turbine, a valve controlling the delivery of fluid through said passage, a pump driven at a speed proportional to the speed of the turbine, an agent, subsidiary to said pump, for actuating said valve and means for periodically varying the effective effort of said pump whereby said valve is caused to pulsate the fluid delivered to said turbine.

12. In combination with an elastic fluid turbine, a fluid-supply passage delivering motive fluid to said turbine, a valve controlling the delivery of fluid through said passage, a pump driven by said turbine, a hydraulic system subsidiary to said pump and operated thereby, a pressure chamber located within said system, means, responsive to variations of pressure within said chamber, for actuating said valve and a periodically-opening by-pass for varying the effective effort of said pump whereby said means is caused to pulsate said valve.

13. In combination with an elastic fluid turbine, a fluid-supply passage delivering motive fluid to said turbine, a pump driven by said turbine, a pressure chamber auxiliary to said pump, a diaphragm within said chamber and sensitive to variations of pressure delivered by said pump, a valve actuated by said diaphragm and controlling the delivery of motive fluid through said passage and means for varying the effective effort of said pump whereby said valve is caused to pulsate the fluid delivered to said turbine.

14. In combination with an elastic fluid turbine, a fluid-supply passage delivering motive fluid to said turbine, a pump driven by said turbine, a pressure chamber auxiliary to said pump, a diaphragm within said chamber and sensitive to variations of pressure delivered by said pump, a valve actuated by said diaphragm and controlling the delivery of motive fluid through said passage and a periodically opening by-pass for said pump for varying the effective effort of the pump and thereby causing the valve to pulsate the fluid delivered to said turbine.

15. In combination with an elastic fluid turbine, a fluid-supply passage delivering motive fluid to said turbine, a valve controlling the delivery of fluid to said passage, a pump driven by the turbine, a pressure chamber receiving fluid from said pump and
5 means, sensitive to the pressure within said chamber, for actuating said valve and for pulsating the fluid delivered to said turbine.

In testimony whereof, I have hereunto subscribed my name this sixth day of March, 1905.

RAYMOND N. EHRHART.

Witnesses:
DAVID WILLIAMS,
E. W. McCALLESTER.